United States Patent [19]

Gortsema

[11] 4,190,439

[45] Feb. 26, 1980

[54] PROCESS FOR THE PREPARATION OF FINE GRAIN METAL CARBIDE POWDERS AND SINTERED ARTICLES THEREFROM

[75] Inventor: Frank P. Gortsema, Croton, N.Y.

[73] Assignee: Union Carbide Corporation, New York, N.Y.

[21] Appl. No.: 624,401

[22] Filed: Oct. 21, 1975

Related U.S. Application Data

[62] Division of Ser. No. 429,269, Dec. 28, 1973, Pat. No. 3,932,594.

[51] Int. Cl.$^2$ ................................................ B22F 1/00
[52] U.S. Cl. ........................................ 75/211; 423/439; 423/440; 106/46; 106/43; 106/47 R
[58] Field of Search ...................... 75/211; 106/46, 47, 106/43; 423/439, 440

[56] References Cited

U.S. PATENT DOCUMENTS

| | | | |
|---|---|---|---|
| 3,380,839 | 4/1968 | Clar et al. | 106/43 |
| 3,385,915 | 5/1968 | Hamling | 252/301.1 R |
| 3,403,008 | 9/1968 | Hamling | 423/440 |
| 3,663,182 | 5/1972 | Hamling | 252/301.1 R |

FOREIGN PATENT DOCUMENTS 784140  4/1968  Canada.

*Primary Examiner*—Brooks H. Hunt
*Attorney, Agent, or Firm*—William Raymond Moran

[57] ABSTRACT

Fine grain metal carbide powders are conveniently prepared from the corresponding metal oxide by heating in an atmosphere of methane in hydrogen. Sintered articles having a density approaching the theoretical density of the metal carbide itself can be fabricated from the powders by cold pressing, hot pressing or other techniques.

10 Claims, No Drawings

PROCESS FOR THE PREPARATION OF FINE GRAIN METAL CARBIDE POWDERS AND SINTERED ARTICLES THEREFROM

This application is a division of our prior U.S. application Ser. No. 429,269 filing date Dec. 28, 1973 now U.S. Pat. No. 3,932,594.

This invention relates in general to a process for the preparation of fine grain, metal carbide powders. In one aspect, this invention is directed to a process for the preparation of fine grain carbide powders of metals such as tantalum, titanium tungsten, mixtures of tungsten and cobalt, and the like. In a further aspect this invention is directed to high strength and/or high surface area, sintered, metal carbide articles.

The prior art has disclosed various method for producing metal carbide, structures, such as fibers, yarns, fabrics and the like. For example, one method is disclosed by B. H. Hamling in U.S. Pat. No. 3,403,008. This method consists of impregnating a preformed organic polymeric material, such as rayon, with a solution of a metal compound. Thereafter, the impregnated material is heated to evolve volatile decomposition products, leaving a carbonaceous relic containing the metal in finely dispersed form. Finally, the relic is further heated to 1000° to 2000° C. in a non-oxidizing atmosphere to form the metal carbide. The resulting metal carbide has a shape similar to that of the starting rayon material.

In U.S. Pat. No. 3,246,950 which issued to B. A. Gruber silicon carbide fibers of up to one inch in length are produced by the reaction of silicon monoxide and carbon monoxide in the vapor phase. Zirconium carbide fibers have also been produced by a process, as set forth in U.S. Pat. No. 3,385,669 to R. A. Clifton, et al, which comprises reacting fibers of zirconium oxide with carbon in an inert environment at an elevated temperature of about 1700° C.

U.S. Pat. Nos. 3,269,802 and 3,374,102 which issued to E. Wainer et al are directed respectively to the preparation of carbide structures and cross-linked carbon products containing metal carbides. The first patent converts a carbonized material such as a filament or shaped product into a metal carbide by heating in an atmosphere containing as a vapor the halide or carbonyl of the carbide forming metal. The second patent improves the strength and flexibility of the metal carbides of the first Wainer et al patent by converting only up to 25 mol percent of the carbonized product to carbide.

All of the above mentioned patents are directed to metal carbide or metal-carbide-containing structures or articles, such as fibers, textiles and shaped articles. None of these prior art patents teaches the preparation of fine grain metal carbide powders which are sinterable into metal carbide articles having a density approaching the theoretical density of the metal carbide itself.

Accordingly, one or more of the following objects will be achieved by the practice of this invention. It is an object of this invention to provide a process for the preparation of fine grain, metal carbide powders. Another object of this invention is to provide fine grain carbide powders of metals such as tantalum, tungsten, titanium, and the like. A further object is to provide carbide powders of tungsten and cobalt. A still further object of this invention is to provide fine grain metal carbide powders which are sinterable into metal carbide articles. Another object is to provide sintered metal carbide articles having densities approaching that of the metal carbide itself. These and other objects will, readily become apparent to those skilled in the art in the light of the teachings herein set forth.

In its broad aspect this invention is directed to a process for the preparation of fine grain metal carbide powders and sintered articles. The metal carbide powders are prepared by a process which comprises the steps of:
(a) impregnating a carbohydrate material with a compound of a metal;
(b) igniting the impregnated material product of step (a) to produce fragile agglomerates of sub-micron size metal oxide particles;
(c) comminuting the metal oxide product of step (b) to produce finely divided metal oxide powder having a mean particle size below one micron; and
(d) heating said metal oxide powder in an atmosphere of methane and hydrogen to convert said metal oxide powder to metal carbide powder.

The metal carbide powders prepared by the process of this invention are characterized by an exceptionally fine grain, i.e. averaging less than 1 micron in size, which renders them ideally suitable for low temperature sintereing. In most instances, sintered articles can be prepared which have a density close to the theoretical density of the metal carbide.

It has been observed that for the most part commercially available metal carbides do not undergo sintering as easily and at the relatively low temperatures employed in the present invention. In contrast the metal carbides prepared by the process of this invention, sinter essentially to the theoretical density of the metal carbide at relatively low temperatures.

The present invention is based upon the discovery that ultra-fine metal oxide powders can be prepared by a relatively uncomplicated and inexpensive method, wherein the powders that are produced by this method can be converted to the metal carbide and sintered essentially to their theoretical densities at relatively low temperatures, that is, temperatures significantly lower than those employed in the prior art. As indicated above, the method of the invention comprises contacting a metal compound with a carbohydrate material, igniting the material to decompose and remove the carbohydrate material and to insure conversion of substantially all of the metal compound to fragile agglomerates of its metal oxide, followed by comminution of the thus formed agglomerates to give the uniform, ultra-fine powders of this invention. Thereafter the metal oxide is converted to the carbide, and if desired sintered into useful articles.

One of the advantages of this method is that the particles prepared by this dispersive precursor method, and which make up the agglomerate, are already of the proper size and uniformity. Thus, since the powders produced by this method have an extremely small and uniform particle size, they can be sintered to form useful high stength pressed bodies at relatively low sintering temperatures.

The metal compounds employed in the preparation of the metal oxides are compounds of one or more metals whose ashes will remain as agglomerates during the ignition step, as opposed to densifying into solid coherent, large particles which would then require fracturing during comminution rather than disruption of the aggregates as employed in the instant invention. Examples of metals whose compounds can be employed, either singly or in mixtures thereof, include tungsten, titanium, tantalum, molybdenum, zirconium, hafnium, thorium, and mixtures thereof.

In practice, the metal compounds that are in the impregnation step are preferably water-soluble compounds such as halides, oxyhalides, nitrates, sulfates, oxylates, and the like. Specific illustrative water-soluble metal compounds include zirconyl chloride, zirconium acetate, zirconium citrate, tantalum oxalate, thorium chloride, titanium chloride, hafnium oxychloride, metal acetates, and the like.

A preferred method of impregnation is to immerse the carbohydrate material in an aqueous solution of the metal compound(s). After immersion the loaded material is removed from the solution and the excess liquid is removed by centrifugation, squeezing, blotting, or the like. Centrifugation is a preferred method for removal of the excess liquid. With liquid precursor compositions, e.g. solutions containing soluble carbohydrates, the preferred method is to dehydrate and char the mixture by heating at 80° to 100° C.

In the impregnation step, relatively inexpensive forms of carbohydrate material can be used for this aspect of the invention. For instance, essentially solid materials such as paper, wood pulp, rayon and cotton linters are useful, inexpensive materials than can be used for the impregnation, as well as the other types of materials. The material can be employed in a wide variety of forms. For example, they can be present as fibers or spun from a viscous solution into a fibrous form. They can also be extruded into filaments or be present as powders.

Alternatively, a salt solution of the oxide or oxides of interest can be mixed with starch or a solution of a soluble carbohydrate material such as sugars, i.e., glucose or sucrose, or hydrolyzed starch. Hence the term "contacting" as employed in the first step of the process for making the metal oxide powders is intended to encompass both impregnation of solid materials and dissolution in liquid materials to form intimate mixtures of the two.

The second step in the production of the finely divided metal oxide is the ignition of the carbohydrate material containing the metal compound impregnated therein. The ignition can be carried out simply by rapidly heating the loaded material in air to a temperature sufficient to ignite the carbohydrate material.

In many cases, the term "ignition" implies combustion accompanied by flame. However, flame is not necessarily present in all cases of ignition as desired in the present invention. The important factor is to effect decomposition and removal of the carbohydrate material by a method which produces fragile agglomerates of very small particles of metal compound(s) which are present in the carbohydrate interstices. Thus, the ignition step employed herein has as its object the opposite effect from the heating step employed in the process of the Hamling U.S. Pat. No. 3,385,915. In said process, it is desired to maintain the structural integrity of the polymeric precursor in order to produce an object having the same configuration as the polymer.

If ignition were employed in the process of the Hamling Patent, the resulting product would not inherently be a fragile agglomerate. As indicated at column 7 lines 37 et seq. of that patent if the organic material ignites instead of carbonizes, the melting point of intermediate metal compounds might be exceeded or excessive crystallization and grain growth may occur. Thus, during the ignition step of this invention, temperature preferably should not exceed the temperature at which sintering to uniform relatively non-fragile agglomerates occurs. This temperature varies from one metal oxide to another, but will normally be from about 900° to about 1300° C. For zirconia, for example, it is desired not to exceed about 1000° C. to about 1100° C.

After ignition, the metal oxide (which can be referred to at this point as an "ash") is comminuted to break up the fragile agglomerates to form the ultrafine powder of the invention. The comminution can be effected by any convenient method which is suitable for this purpose.

By the term "comminution", "disruption" or "pulverizing" as used throughout the specification and appended claims is meant the separation of the individual particles which form the agglomerate without the need for further subdivision or fracturing of the particles. Hence any method which can achieve this end can be employed. However, from a practical viewpoint it has been found that wet ball milling accomplishes this best.

The metal oxide powders obtained by the comminution step and which are employed in the preparation of the metal carbide powders of this invention are those having a mean particle size below one micron. These finely-divided metal oxide powders are ideally suited for conversion into the fine grain metal carbides.

As previously indicated, the metal oxide material to be converted to the corresponding carbide must be ultra-fine grained in order for the conversion into the carbide and subsequent sintered article to take place at low temperatures. Thus, it is essential that the metal oxide itself be a fine grain powder of average particle size of less than about 1 to 2 micron in order that the resulting carbide obtained after sintering also maintains a fine grain size of the same magnitude. Carbide formation as described in the prior art usually involves high temperature reaction, such as 1500°–2500° C. for a long period of time. This is especially true for the high melting carbides such as tantalum and niobium. Carbides, such as tungsten and molybdenum, may be formed at low temperatures, but extended reaction times are usually required.

However, in the process of the present invention, it has been found that conversion to the carbide can be achieved at considerably lower temperatures of from about 800° C. to about 1200° C. and periods of time of from about 1 to about 5 hours have been found suitable for conversion to the carbide. The exact temperatures employed will, of course, vary within this range for the individual metal oxide.

In order to insure that the metal oxide is the desired ultra-fine grain size, it has been found that a convenient way to monitor the activity of the starting metal oxides powder is the BET $N_2$ adsorption specific surface area. When the equivalent spherical diameter (as calculated from the specific surface area by known methods) is less than 1000° Å, and more preferably less than 500° Å the reaction of the oxides to the carbide is reasonably rapid and complete and can be effected at relatively low temperatures.

As indicated, conversion of the metal oxide to the metal carbide is effected by heating the metal oxide powder in an atmosphere of methane and hydrogen. In practice, it has been found that an atmosphere of hydrogen containing from about 0.1 to about 10 volume percent methane is effective for converting the metal oxide to the carbide. Concentrations above and below this amount can also be employed but are less preferred. A particularly preferred mixture is one containing from about 0.2 to about 5 volume percent methane in hydrogen.

The sintered metal carbide objects of the invention can be prepared by conventional sintering techniques, except that the temperatures that can be employed are significantly lower than those heretofore employed for sintering metal carbide powders. The metal carbide sintered bodies can be hot pressed, or they can be cold pressed followed by heating to sintering temperature.

In another aspect, this invention is directed to the preparation of metal carbide mixtures, for example cobalt-tungsten carbides and nickel-tungsten carbides. In these cases the fine grain mixed oxide prepared by the precursor technique is carburized in a mixture of $H_2$ and hydrocarbon at a temperature and hydrocarbon partial pressure such that one component forms a hard carbide, while the other component is reduced to finely divided metal. Subsequent hot pressing or cold pressing followed by sintering at elevated temperatures of this material using known techniques leads to dense bodies of tungsten carbide with a cobalt binder. These materials have utility for hard facing, flame spraying powders, and the like. Variations in the process lead to powders having different properties, and consequently useful for specific applications.

One aspect of this invention is a powder of cobalt-tungsten carbide when the cobalt content can vary from 0–30%, in which the aggregrate size is allowed to increase to the maximum attainable by this precursor process. Such powders are useful in plasma spray application where the desired powder size is 325 mesh (U.S. Standard sieve size). In this case a soluble cobalt salt and soluble tungsten salt are mixed in a common solvent to give the desired ratio of Co to W in the final product. A sugar solution (such as corn syrup) or soluble starch in a volume proportion of ¼ to 1 to 4 to 1 (corn syrup to salt solution) is added to the mixed salt solution. The amount of corn syrup is not critical but most frequently a 1:1 volume ratio is used. The thoroughly mixed solution is heated to drive off excess water and char the corn syrup. This process is continued until the whole mass is a rigidized char. The char is then broken up into a powder of 16–20 mesh and air oxidized in a forced air furnace to convert the mixture to a mixed oxide. In the case of the cobalt tungsten mixed oxide, x-ray diffraction indicates the oxidized product to be $CoWO_4$ plus a small amount of free $WO_3$ and Co oxide. The material is then powdered by micromilling for a short time and loaded into a furnace through which a stream of $CH_4$-$H_2$ is introduced. In practice, this is generally done in a rotating $Al_2O_3$ tube inside a furnace, so that the powder does not cake or plug the tube. A heat treatment at 900° to 1100° C. in an atmosphere consisting of 0.3 to 5% $CH_4$ in $H_2$ converted the mixed oxide (BET S=5 $m^2/g$) to an intimate mixture of Co-WC. Surface area measurements on the final product were in the range 0.1 to 5 $m^2/g$. Densities of the powder, determined using a pyknometer in methanol ranged from 12.8 to 14.3 g/cc.

These Co/WC materials in powder form can be used to prepare dense bodies of Co/WC composites by hot pressing, or by cold pressing followed by high temperature sintering.

A more active form of the above range of composition, e.g., Co/WC, can be made by subjecting the powder as obtained from the air oxidation step described in the preceding paragraphs, to a ball milling step in water or nonaqueous solvent, with $ZrO_2$ beads for several days. The suspended solids are charged with "Darvan-C", centrifuged under such conditions that particles 0.5μ and smaller remain suspended, and all larger particles precipitate. The suspended mixed oxide is poured off the precipitate, discharged by addition of a small amount of acetic acid, washed with water, acetone and dried. The BET surface area of the mixed oxide ranges from 10–20 $m^2/g$.

This material can be carbided in 0.5 to 5% $CH_4$ in $H_2$ mixtures to give Co/WC at temperatures ranging from 800°–1200° C. The preferred temperature is approximately 1000° C., for times varying from 1 to 5 hours, depending on the reaction apparatus and degree of mixing of the solid and gas, to avoid gas channeling due to solid caking. The Co/WC powder product showed densities ranging from 13 to 14.3 g/cc and specific surface areas ranging from 1.33 $m^2/g$ and higher. This material could be hot pressed to near theoretical density, or cold pressed followed by sintering at high temperature.

As previously indicated the metal carbide powders prepared by the process of this invention are useful for a wide variety of applications. In addition to plasma spray applications the metal carbide powders are useful in applications where strength, stiffness and hardness are desired. For example, the metal carbide powders can be used in the preparation of tool bits. The present invention permits the formation of dense bodies at fabrication temperature much lower than obtained using conventional ceramic technology. Not only is no binder needed, but the temperature required is much lower and the times shorter to achieve high density bodies than in the current state-of-the-art. This results in economic advantage in the production of such materials. Other potential uses include the use of carbides in metal that wet the carbide to yield composites that have desirable abrasion or wear resistance properties.

The following examples are illustrative:

EXAMPLE 1

Preparation of a Sintered Tantalum Carbide Article

A $Ta_2O_5$ powder, made by the precursor process by low temperature air oxidation of a charred tantalum oxalate-corn syrup solution, ball milling, and centrifugal sizing gave an active powder with the following properties: Surface area (by $N_2$ BET) 73.8 $m^2/g$ corresponding to an equivalent spherical particle diameter of 89° Å, pyknometric density 5.87 g/cc (theoretical 9.05 g/cc). This powder was heated in a rotary furnace through which was passed a gas mixture of 5% $CH_4$ in $H_2$ (flow rate: 3 l/min $H_2$) at 1050° C. for 4½ hours. The resultant TaC powder has a density of 10.2 g/cc and specific surface area of 5.1 $m^2/g$. This material was ground with a mortar and perstle sieved through 325 mesh and cold pressed at 15 Tons/$in^2$ to give a pellet with a green density of 4.54 g/cc (31.5% of theo.). No binder was needed. The green pellet was heated in $H_2$ for 6 minutes at 1900° C. to give a metallic sintered TaC body having a density of 9.1 g/cc.

EXAMPLE 2

Preparation of Tantalum Carbide Powder

A sample of $Ta_2O_5$, prepared by the precursor process, but not attending to the many details in procedure that promote the preparation of an ultrafine grain microstructure, had a specific surface area of 6 $m^2/g$. This powder was heated in 5% $CH_4/H_2$ for 35 hours at 1007° C. at a $H_2$ flow rate of 1.38 l/min. The resultant powder when analyzed chemically showed the presence of a high free carbon content (10.02%). X-ray diffraction of the sample showed the presence of well crystallized TaC. Attempts were made to remove the excess carbon by prolonged heating in $H_2$ at temperatures between 800° and 1300° C., but very little carbon was removed.

EXAMPLE 3

Preparation of Tantalum Carbide Powder

A $Ta_2O_5$ powder prepared by the precursor technique had a specific surface area of 45.2 m$^2$/g. This material was heated in a quartz rotary furnace in an atmosphere of 5% $CH_4$ in $H_2$ ($H_2$ flow rate 3 l/min) at T=1018°–1070° C. for 5⅜ hours. The resultant black material was shown by x-ray to be pure TaC. The powder had a pyknometric density of 11.0 g/cc (in methanol) and a specific surface area of 9.3 m$^2$/g, which corresponds rough to particles of 400°–500° A as spheres.

EXAMPLE 4

Effect of Temperature on Conversion to the Carbide

A sample of ultra fine grained $Ta_2O_5$, having a specific surface area of 59.6 m$^2$/g was heated in 5% $CH_4/H_2$ at a $H_2$ flow rate of 3 l/min for 2 hours at a temperature of 1050°–1180° C. in a rotary furnace. Analysis of the product by x-ray diffraction showed crystalline TaC and $Ta_2O_5$.

The sample was reheated in $CH_4/H_2$ at 1175° C. for an additional 4½ hours in the same atmosphere composition and flow conditions, but the material did not undergo further conversion to TaC as shown by x-ray. An additional heat treatment for 7 hours under the same conditions at 1180° C. again showed no further conversion of unreacted $Ta_2O_5$ to TaC. The x-ray of the powder product showed that the initially broad lines of the $Ta_2O_5$ had become very sharp and narrow, indicating grain growth of the $Ta_2O_5$ phase, with the resultant loss reactivity. Thus, once the material becomes highly crystalline, further treatment will not give additional conversion. Hence, the efficacy of conversion to TaC is better when lower temperatures are employed for longer periods of time rather than the higher temperature, i.e., 1180° C. for shorter times.

EXAMPLE 5

Preparation of a Cobalt-Tungsten Carbide Sintered Article by Cold Pressing

A cobalt-tungsten salt solution was prepared by mixing 250 ml of ammonium metatungstate (e.g.=2.82, 1.45 g $WO_3$/ml) with 219 g $CoCl.6H_2O$, 25 ml concentrated HCl, 50 ml water, and 250 ml corn syrup. The components were thoroughly mixed and heated to gradually evaporate water and decompose the entire mass into a cellular friable char to a final temperature of 200° C. The char was broken up to 16–20 mesh and ignited in air at 800° C. for 45 minutes. X-ray diffraction of the resulting powder showed a strong pattern of $CoWO_4$. The surface area was 0.39 m$^2$/g.

The mixed oxide (93.2 g) was converted to the carbide by heating the powder in an $Al_2O_3$ tube rotating in a furnace in a gas stream consisting gas was changed to pure $H_2$ when the temperature decreased below 900° C. The resultant carbide (76.1 g) was sieved through U.S. standard screens to give 26.0 g (34.2%) 400 mesh and 50.1 g (65.8%) 325 mesh powder. X-ray diffraction of the powder showed very crystalline WC with weak cubic Co lines. The cell constant for the Co was 3,545° Å (reported 3.434° Å).

A portion of the Co/WC powder was cold pressed at 13.5 Tons/in$^2$ into a bar with a green density of 4.4 g/cc. This bar was heated in $H_2$ to 1400° C. and held at 1400° C. for 30 minutes. During this heat treatment the bar became very metallic and shrunk in length approximately 25%. The geometrical density was 13.8 g/cc (97% theoretical).

EXAMPLE 6

Preparation of a Cobalt-Tungsten Carbide Sintered Article by Hot Pressing

A $CoWO_4$-$WO_3$ powder, prepared as described in the preceeding example was subjected to an additional ball milling treatment for 6 days in water using zirconia beads. The slurry was suspended by adding "Darvan C" (5 drops/0.5), centrifuging at 1200 rpm and retaining "fines" in the supernatant. After separation, the "fines" were precipitated by de-charging the suspended material with acetic acid. The material was washed with water and acetone, dried and powdered using a microblender. The $CoWO_4$ starting material used for conversion to the carbide had a surface area of 15.2 m$^2$/g and a density of 10.93 g/cc. The carbide prepared by heating in $CH_4/H_2$ stream at 812–916° C. for 3 hrs had a pyknometric powder density of 14.5 g/cc. X-ray indicated a very strong pattern of WC with a very weak cubic Co pattern. Chemical analysis gave 12.67% Co, 80.02% W, 4.88% carbide, 1.50% free carbon, indicating the composition $WC_{0.93}.0.5$ Co.

A bar of 400 mesh Co.WC powder, 1×¼" was hot pressed at a temperature of 1298°–1398° C. at a ram pressure of 1200 lbs (2.4 Tons/in$^2$) in a graphite die in vacuum. The resulting Co/WC press had a geometrical density of 13.6 g/cc (95% theoretical) and a modulus rupture of 280,000 psi when tested in 3-point loading in a Tinius Olsen testing machine, at room temperature.

EXAMPLE 7

Preparation of a Cobalt-Tungsten Sintered Article by Cold Pressing

Co/WC powder prepared by heating the oxide in $CH_4/H_2$ as described in example 6, was cold pressed into a 1½"×¼" at 13.5 Tons/in$^2$ to give a bar with a green density of 4.4 g/cc. The sample was then heated in a carbon susceptor using an induction furnace at 1400° C. for 30 min, followed by rapid cooling. The bar was then squared off, polished and measured. The geometrical density was 13.81 g/cc, 96.5% of theoretical.

EXAMPLE 8

Preparation of Cobalt Tungsten Carbide

The impregnating solution was prepared by combining 3 l of 1.84 s.g. ammonium metatungstate (AMT) solution (775 g W/l) with 506 g $CoCl_2.6H_2O$. The cobalt salt was dissolved by stirring the solution. To this solution was added 728 g paper pulp and impregnated for 7 days. The loaded paper pulp was centrifuged to rid it of excess solution at 3000 rpm in paper towels for 10 minutes, followed by air drying for 24 hours. The dried material was placed in trays and oxidized in a forced air furnace at 400° C. to give a greenish blue oxide with a specific surface area 1.33 m$^2$/g.

The oxide material was placed in an alumina boat and then the boat placed in a tube furnace through which $H_2$ was passing at a flow rate of 3.0 l/min. The temperature was increased to 705° C. and $CH_4$ was added so as to give a 5 v/o $CH_4$ mixture in $H_2$. The temperature was raised to 1050° C. and held at 1030°–1050° C. for 4 hours. The powder was given a 40 minute post treatment in pure $H_2$ at 1030° C. and then the system was cooled to room temperature.

The cobalt/tungsten carbide sample powder was divided into 2 portions—top and bottom for chemical analysis to determine the homogeneity of the preparation. The analytical data are as follows:

Top: W 88.30, carbide 5.81, free carbon 0.00, oxygen 0.075%

Bottom: W 88.12, carbide 5.87, free carbon 0.00, oxygen 0.066%.

Although the invention has been illustrated by the preceding examples it is not to be construed as being limited to the materials employed therein, but rather, the invention relates to the generic area as hereinbefore disclosed. Various modification and embodiments can be made without departing from the spirit and scope thereof.

What is claimed is:

1. A process for producing sintered metal carbide articles which comprises the steps of:
   (a) impregnating a carbohydrate material with a compound of a metal;
   (b) igniting the impregnated material product of step (a) to produce fragile agglomerates of sub-micron size metal oxide particles;
   (c) comminuting the metal oxide product of step (b) to produce finely divided metal oxide powder having a mean particle size below one micron;
   (d) heating said metal oxide powder in an atmosphere of methane and hydrogen to convert said metal oxide powder to metal carbide powder;
   (e) compressing and sintering said metal carbide powder into a shaped article.

2. The process of claim 1 wherein said metal is tungsten, titanium, tantalum, molybdenum, zirconium, hafnium, thorium or mixtures thereof.

3. The process of claim 2 wherein said carbohydrate material is cellulosic.

4. The process of claim 3 wherein the cellulosic material is rayon.

5. The process of claim 2 wherein said carbohydrate material is soluble carbohydrate.

6. The process of claim 5 wherein said soluble carbohydrate is a sugar.

7. The process of claim 5 wherein said soluble carbohydrate is a starch.

8. The process of claim 2 wherein said metal is a mixture of tungsten and coblat.

9. The process of claim 2 wherein said metal is a mixture of tungsten and nickel.

10. The process of claim 2 wherein said heating is conducted at a temperature of from about 800° to about 1200° C.

* * * * *